(12) United States Patent
Park et al.

(10) Patent No.: US 12,347,250 B2
(45) Date of Patent: Jul. 1, 2025

(54) SYSTEM FOR ANALYZING OPERATION CAUSE OF CRASH SAFETY CONTROL LOGIC OF VEHICLE AND OPERATING METHOD THEREOF

(71) Applicants: Hyundai Motor Company, Seoul (KR); Kia Corporation, Seoul (KR); Seoul National University R&DB Foundation, Seoul (KR)

(72) Inventors: Hyung Wook Park, Seoul (KR); Sung Roh Yoon, Seoul (KR); Dong Hyeok Lee, Seoul (KR)

(73) Assignees: HYUNDAI MOTOR COMPANY, Seoul (KR); KIA MOTORS CORPORATION, Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 233 days.

(21) Appl. No.: 18/118,841

(22) Filed: Mar. 8, 2023

(65) Prior Publication Data
US 2024/0304039 A1  Sep. 12, 2024

(30) Foreign Application Priority Data
Jun. 24, 2022  (KR) .................. 10-2022-0077383

(51) Int. Cl.
*G07C 5/08*  (2006.01)
*B60W 50/02*  (2012.01)

(52) U.S. Cl.
CPC ....... *G07C 5/0808* (2013.01); *B60W 50/0205* (2013.01)

(58) Field of Classification Search
CPC . G07C 5/0808; B60W 50/0205; B60W 50/00; B60W 2050/0016; B60W 2050/0043; B60W 2050/0083; G05B 23/0243; G05B 2219/2637; G05B 23/0256; B60R 21/0136; B60R 21/013; G06N 3/08; G06N 20/00
See application file for complete search history.

(56) References Cited

U.S. PATENT DOCUMENTS 11,789,457 B1 * 10/2023 Woo ............... H04R 3/005
                                                          700/253
2021/0312725 A1 * 10/2021 Milton ............ G07C 5/008

* cited by examiner

*Primary Examiner* — Michael V Kerrigan
(74) *Attorney, Agent, or Firm* — MORGAN, LEWIS & BOCKIUS LLP

(57) ABSTRACT

Various embodiments of the present disclosure relate to a system for analyzing an operation cause of a crash safety control logic of a vehicle an operation method thereof. The system for analyzing an operation cause of a crash safety control logic of a vehicle comprising: a collision safety model configured to receive a collision signal including signal values obtained from a plurality of collision detection sensors and to output a first collision type determination result corresponding to the collision signal according to a deep learning-based crash safety control logic; and an association analyzer configured to analyze an association between collision types included in the plurality of collision detection sensors and the first collision type determination result based on the collision signal and the first collision type determination result.

16 Claims, 7 Drawing Sheets

SYSTEM FOR ANALYZING OPERATION CAUSE OF CRASH SAFETY CONTROL LOGIC OF VEHICLE AND OPERATING METHOD THEREOF

CROSS-REFERENCE TO RELATED APPLICATIONS

The present application claims priority to Korean Patent Application No. 10-2022-0077383, filed Jun. 24, 2022, the entire contents of which is incorporated herein for all purposes by this reference.

TECHNICAL FIELD

Various embodiments of the present disclosure relate to a system for analyzing an operation cause of a crash (or collision) safety control logic of a vehicle based on an explainable artificial intelligence XAI and an operation method thereof.

BACKGROUND

Recently, advanced driver assistance systems (ADAS) are being developed to assist a driver with operating a vehicle. The ADAS has multiple sub-technology categories and provides convenience to a driver. Such ADA S is also called an autonomous driving system or an ADS for "Automated Driving System".

Meanwhile, a vehicle has a passenger protection device (or a safety device) such as an airbag and/or a PSB (pre safe seat belt) in order to protect a passenger, and operates the passenger protection device when being involved in a collision. For example, the vehicle may predict and/or detect a collision with a nearby object (for example, another vehicle or a pedestrian) during autonomous driving, and operate the passenger protection device according to a crash safety control logic.

Conventionally, for operation of the passenger protection device according to predicted and/or detected collision situations, parameters for the crash safety control logic were tuned based on actual vehicle tests and requirements. However, since there are so many parameters to be considered during the actual vehicle tests, a lot of time is disadvantageously required for tuning the parameters.

Therefore, recently, a crash safety control logic that can control the operation of the passenger protection device in a collision situation by using a deep learning-based model has been developed and studied.

SUMMARY

In order to improve vehicle safety, it is necessary to ensure validity and reliability of the crash safety control logic using the deep learning-based model.

Accordingly, various embodiments of the present disclosure disclose a system for analyzing an operation cause of a deep learning-based crash safety control logic by using an explainable artificial intelligence (XAI) methodology in a vehicle and an operation method thereof.

The technical problems to be solved in the disclosure are not limited to the technical problems mentioned above, and other technical problems that are not mentioned will be clearly understood by those skilled in the art from the following description.

According to various embodiments of the present disclosure, a system for analyzing an operation cause of a crash safety control logic of a vehicle may include a collision safety model configured to receive a collision signal including signal values obtained from a plurality of collision detection sensors and configured to output a first collision type determination result corresponding to the collision signal according to a deep learning-based crash safety control logic, and an association analyzer configured to analyze an association between each of the plurality of collision detection sensors and collision types included in the first collision type determination result based on the collision signal and the first collision type determination result, wherein the association analyzer may be configured to generate a noise signal by changing a first signal value of a first collision detection sensor among the signal values included in the collision signal, to obtain a second collision type determination result corresponding to the noise signal through the collision safety model, and to estimate an association between the first collision detection sensor and the collision types by comparing the first collision type determination result and the second collision type determination result.

According to an embodiment, each of the first collision type determination result and the second collision type determination result may include each probability value for each collision type.

According to an embodiment, the association analyzer may be further configured to estimate an association between the first collision detection sensor in which the first signal value is changed and the collision types by comparing each probability value for each collision type included in the first collision type determination result and each probability value for each collision type included in the second collision type determination result.

According to an embodiment, the association analyzer may be further configured to estimate that, if the each probability value for each collision type included in the first collision type determination result are all the same as the each probability value for each collision type included in the second collision type determination result, the first collision detection sensor and the collision types have no association.

According to an embodiment, the association analyzer may be further configured to estimate that, if probability values for a first collision type in the first collision type determination and the second collision type determination are different as a result of comparing the each probability value for each collision type included in the first collision type determination result and the each probability value for each collision type included in the second collision type determination result, the first collision detection sensor and the first collision type have an association.

According to an embodiment, the association includes an importance degree of the first collision detection sensor for the first collision type, and the importance degree may be determined based on a difference between a probability value of the first collision type included in the first collision type determination result and a probability value of the first collision type included in the second collision type determination result.

According to an embodiment, the association analyzer may be further configured to estimate each association with the collision types with respect to each of collision detection sensors other than first collision detection sensor, and to generate each importance degree map indicating an association between each of the plurality of collision detection sensors and the collision types.

According to an embodiment, the association analyzer may be configured to generate the noise signal by changing the first signal value of the first collision detection sensor included in a designated perturbation range among the signal values included in the collision signal into an arbitrary value, wherein the designated perturbation range may be set to include signal values obtained from the plurality of collision detection sensors after a collision occurrence time.

According to various embodiments, a method of operating a system for analyzing an operation cause of a crash safety control logic of a vehicle may comprise: obtaining a collision signal including signal values obtained from a plurality of collision detection sensors and a first collision type determination result based on the collision signal through a collision safety model; generating a noise signal by changing a first signal value of a first collision detection sensor among the signal values included in the collision signal; obtaining a second collision type determination result based on the noise signal using the collision safety model; and estimating an association between the first collision detection sensor and a plurality of collision types by comparing the first collision type determination result and the second collision type determination result.

According to an embodiment, each of the first collision type determination result and the second collision type determination result may include probability values for the collision types.

According to an embodiment, the association between the first collision detection sensor and the plurality of collision types may be estimated by comparing each probability value for each collision type included in the first collision type determination result and each probability value for each collision type included in the second collision type determination result.

According to an embodiment, if the each probability value for each collision type included in the first collision type determination result are the same as the each probability value for each collision type included in the second collision type determination result, it may be estimated that the first collision detection sensor and the plurality of collision types have no association.

According to an embodiment, if probability values for a first collision type in the first collision type determination and the second collision type determination are different as a result of comparing the each probability value for each collision type included in the first collision type determination result and the each probability value for each collision type included in the second collision type determination result, it may be estimate that the first collision detection sensor and the first collision type have an association.

According to an embodiment, the association includes an importance degree of the first collision detection sensor for the first collision type, and the importance degree may be determined based on a difference between a probability value of the first collision type included in the first collision type determination result and a probability value of the first collision type included in the second collision type determination result.

According to an embodiment, the method may further comprise generating, each importance degree map indicating an association between each of collision detection sensors other than the first collision detection sensor and the collision types may be further included.

According to an embodiment, the noise signal may be generated by changed a signal value of the first collision detection sensor included in a designated perturbation range among signal values included in the collision signal into an arbitrary value, wherein the designated perturbation range may be set to include signal values obtained from the plurality of collision detection sensors after a collision occurrence time.

DETAILED DESCRIPTION

Figure 1:
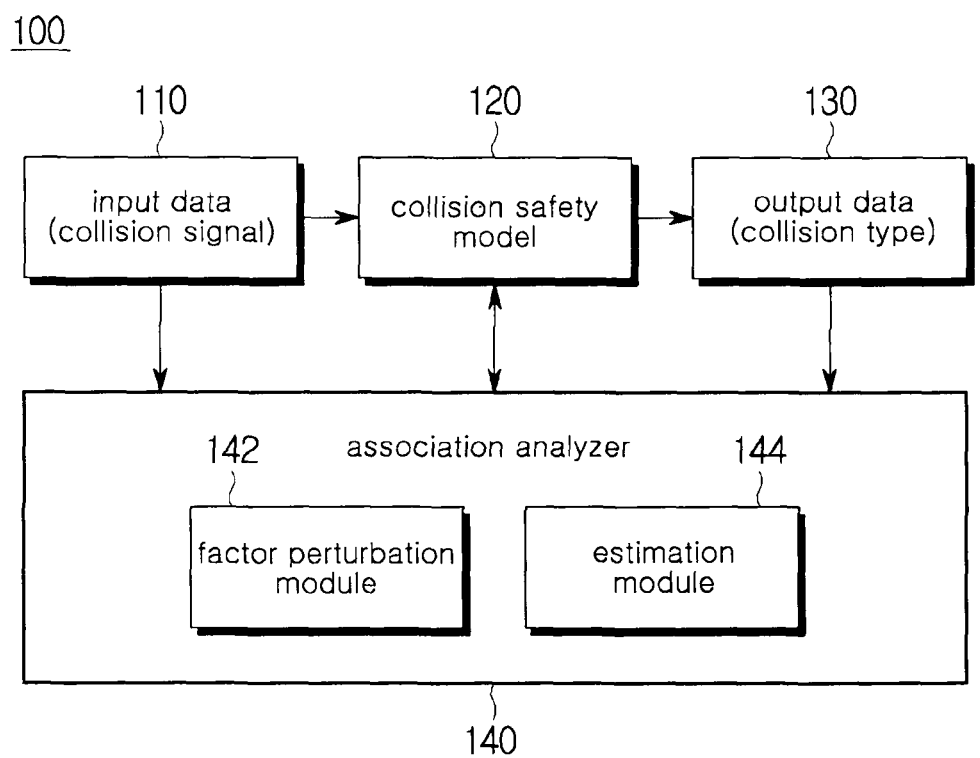
FIG. 1 is a block diagram of an operation cause analysis system that analyzes an operation cause of a crash safety control logic in a vehicle according to various embodiments of the present disclosure.

Hereinafter, embodiments disclosed in this specification will be described in detail with reference to the accompanying drawings. The same or similar elements will be denoted by the same reference numerals irrespective of drawing numbers, and repetitive descriptions thereof will be omitted.

A suffix "module" or "part" for the component, which is used in the following description, is given or mixed in consideration of only convenience for ease of specification, and does not have any distinguishing meaning or function per se. Also, the "module" or "part" may mean software components or hardware components such as a field programmable gate array (FPGA), an application specific integrated circuit (ASIC). The "part" or "module" performs certain functions. However, the "part" or "module" is not meant to be limited to software or hardware. The "part" or "module" may be configured to be placed in an addressable storage medium or to restore one or more processors. Thus, for one example, the "part" or "module" may include components such as software components, object-oriented software components, class components, and task components, and may include processes, functions, attributes, procedures, subroutines, segments of a program code, drivers, firmware, microcode, circuits, data, databases, data structures, tables, arrays, and variables. Components and functions provided in the "part" or "module" may be combined with a smaller number of components and "parts" or "modules" or may be further divided into additional components and "parts" or "modules".

Methods or algorithm steps described relative to some embodiments of the present disclosure may be directly implemented by hardware and software modules that are executed by a processor or may be directly implemented by a combination thereof. The software module may be resident on a RAM, a flash memory, a ROM, an EEPROM, an EEPROM, a resistor, a hard disk, a removable disk, a CD-ROM, or any other type of record medium known to those skilled in the art. An exemplary record medium is coupled to a processor and the processor can read information from the record medium and can record the information in a storage medium. In another way, the record medium may be integrally formed with the processor. The processor and the record medium may be resident within an application specific integrated circuit (ASIC). The ASIC may be resident within a user's terminal.

In the following description of the embodiment disclosed in the present specification, the detailed description of known technologies incorporated herein is omitted to avoid making the subject matter of the embodiment disclosed in the present specification unclear. Also, the accompanied drawings are provided only for more easily describing the embodiment disclosed in the present specification. The technical spirit disclosed in the present specification is not limited by the accompanying drawings. All modification, equivalents and substitutes included in the spirit and scope of the present disclosure are understood to be included in the accompanying drawings.

While terms including ordinal numbers such as the first and the second, etc., can be used to describe various components, the components are not limited by the terms mentioned above. The terms are used only for distinguishing between one component and other components.

In the case where a component is referred to as being "connected" or "accessed" to another component, it should be understood that not only the component is directly connected or accessed to the other component, but also there may exist another component between them. Meanwhile, in the case where a component is referred to as being "directly connected" or "directly accessed" to another component, it should be understood that there is no component therebetween.

Hereinafter, a vehicle in the present disclosure may be a vehicle capable of autonomous driving having an automated driving system (ADS). For example, the vehicle may perform at least one of steering, acceleration, deceleration, lane change, and stopping by the ADS without a driver's manipulation. For example, the ADS may include at least one of a pedestrian detection and collision mitigation system (PDCMS), a lane change decision aid system (LCAS), a land departure warning system (LDWS), an adaptive cruise control (ACC), a lane keeping assistance system (LKAS), a road boundary departure prevention system), a curve speed warning system (CSWS), a forward vehicle collision warning system (FVCWS), and a low-speed following (LSF).

FIG. 1 is a block diagram of an operation cause analysis system that analyzes an operation cause of a crash (or collision) safety control logic in a vehicle according to various embodiments of the present disclosure.

Figure 2:
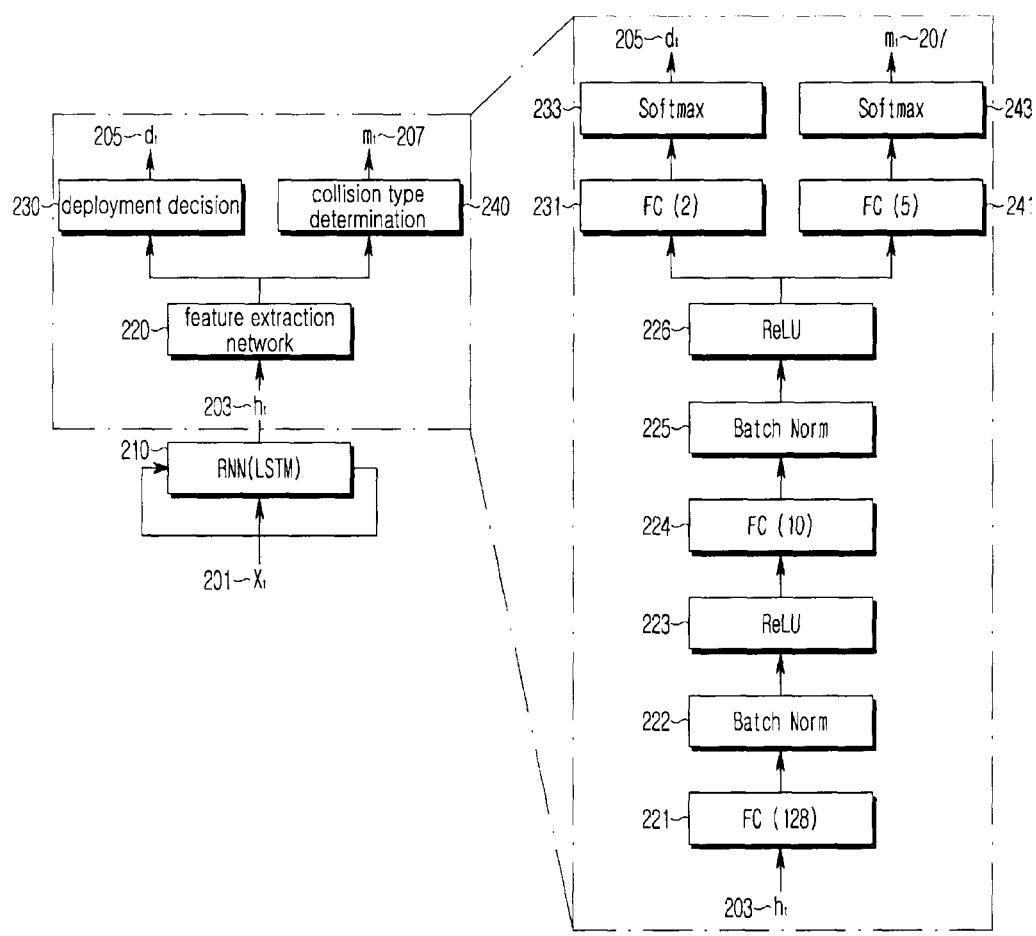
FIG. 2 is a view illustrating a deep learning-based crash safety control logic according to various embodiments of the present disclosure.
Figure 3:
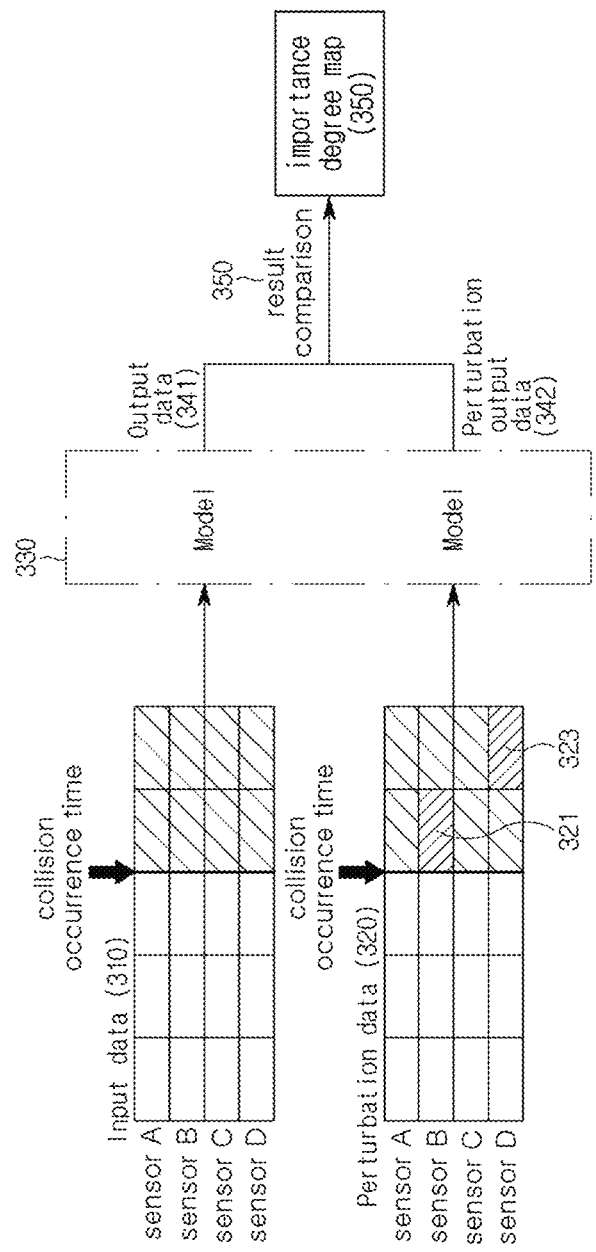
FIG. 3 is an exemplary view analyzing an operation cause by performing perturbation that changes a factor of input data in a vehicle according to various embodiments of the present disclosure.
Figure 4:
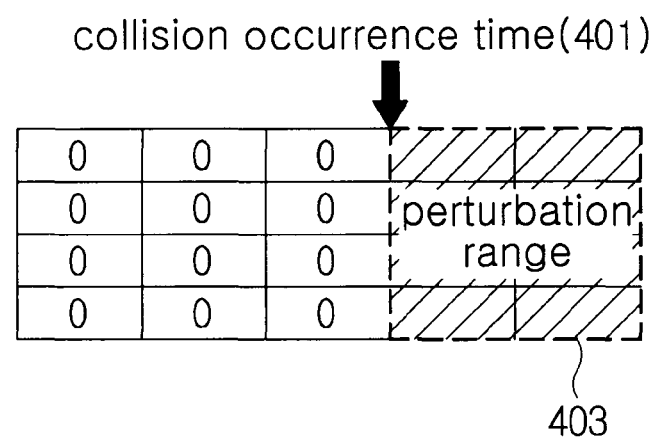
FIG. 4 is an exemplary view indicating a factor perturbation range of input data in a vehicle according to various embodiments of the present disclosure.
Figure 5:
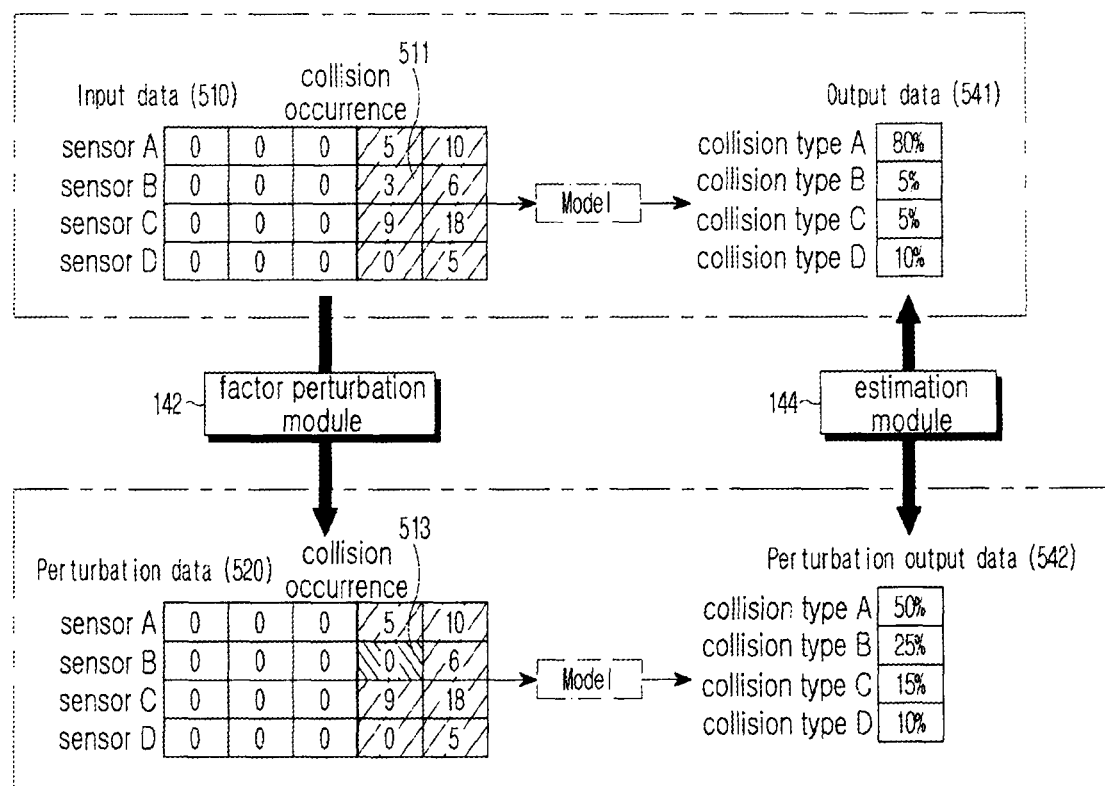
FIG. 5 is an exemplary view analyzing an operation cause of a deep learning-based crash safety control logic by using an XAI methodology in a vehicle according to various embodiments of the present disclosure.
Figure 6:
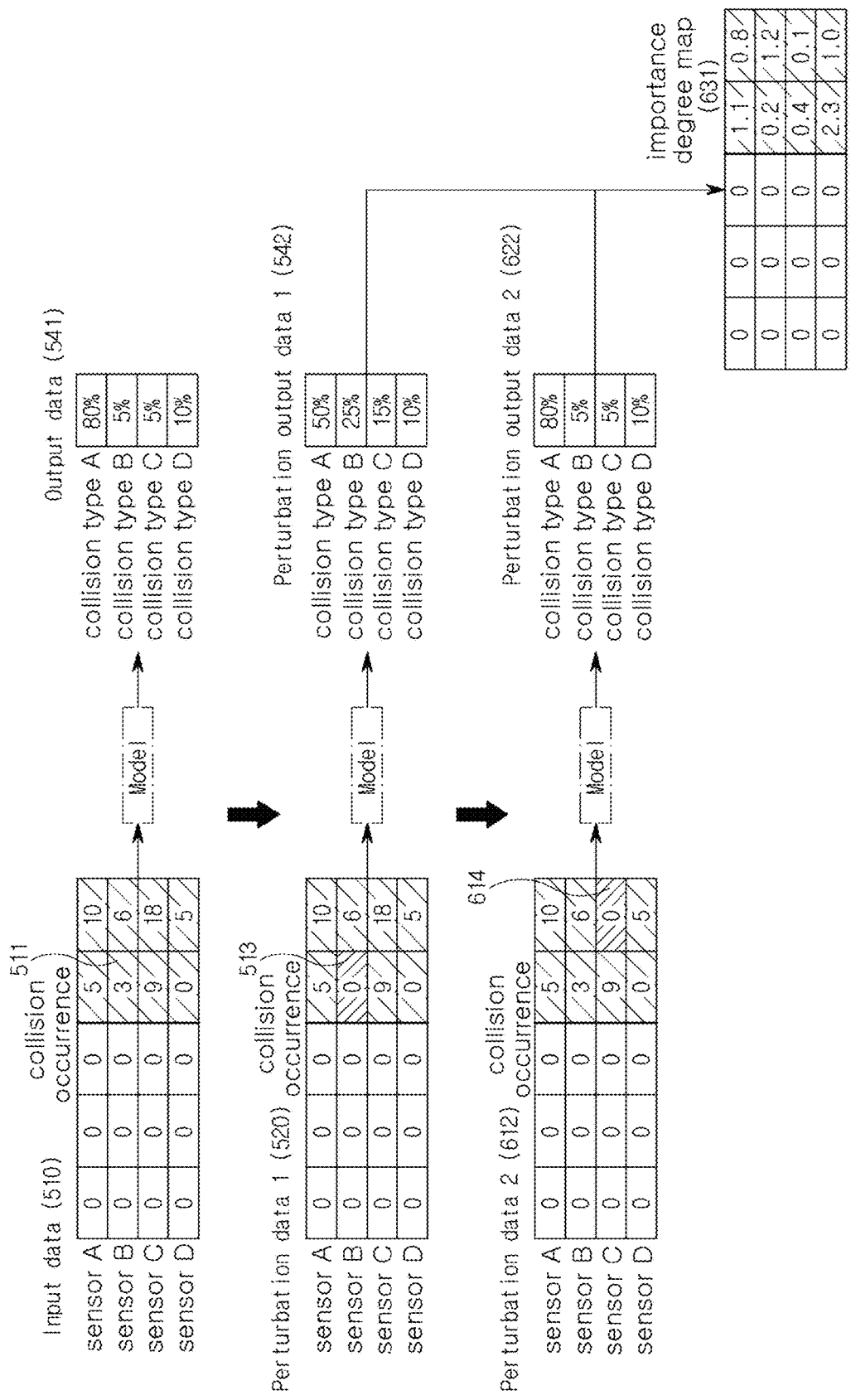
FIG. 6 is an exemplary view obtaining an importance degree map by analyzing an operation cause in a vehicle according to various embodiments of the present disclosure.

A configuration of the operation cause analysis system 100 shown in FIG. 1 is an embodiment, and each component may be configured with one chip, component, or electronic circuit, or may be configured with a combination of chips, components, and/or electronic circuits. According to an embodiment, some of the components shown in FIG. 1 may be divided into several components and may be configured with different chips, components, or electronic circuits; or some components may be combined to form a single chip, component, or electronic circuit. In addition, according to an embodiment, some of the components shown in FIG. 1 may be deleted or components not shown in FIG. 1 may be added thereto. At least some of the components of FIG. 1 will be described with reference to FIGS. 2 to 5. FIG. 2 is a view illustrating a deep learning-based crash safety control logic according to various embodiments of the present disclosure, FIG. 3 is an exemplary view analyzing an operation cause by performing perturbation that changes a factor of input data in a vehicle according to various embodiments of the present disclosure, FIG. 4 is an exemplary view indicating a factor perturbation range of input data in a vehicle according to various embodiments of the present disclosure, FIG. 5 is an exemplary view analyzing an operation cause of a deep learning-based crash safety control logic by using an XAI methodology in a vehicle according to various embodiments of the present disclosure, and FIG. 6 is an exemplary view obtaining an importance degree map by analyzing an operation cause in a vehicle according to various embodiments of the present disclosure.

Hereinafter, it will be described that the operation cause analysis system 100 is provided in a vehicle, but at least a part of the operation cause analysis system 100 may be provided in another device (e.g., a server, an electronic device) capable of wired/wireless communication with the vehicle. For example, a collision safety model 120 may be provided in the vehicle, and an association analyzer 140 may be provided in a server capable of wired/wireless communication with the vehicle. As another example, the collision safety model 120 and the association analyzer 140 may be provided in an electronic device capable of wired/wireless communication with devices inside the vehicle, and may be mounted to the vehicle or separated from the vehicle.

The collision safter model 120 and the association analyzer 140 may be implemented by hardware and software modules that are executed by a processor The processor according to an exemplary embodiment of the present disclosure maybe a hardware device implemented by various electronic circuits (e.g., computer, microprocessor, CPU, ASIC, circuitry, logic circuits, etc.). The processor may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s). According to an embodiment, operations performed by the collision safter model 120 and/or the association analyzer 140 may be performed by one or more processor(s).

Referring to FIG. 1, the operation cause analysis system 100 may include the collision safety model 120 and the association analyzer 140.

According to various embodiments, the collision safety model 120 may output output data 130 according to a deep learning-based crash safety control logic, based on input data 110. The input data 110 may include a collision signal obtained from a plurality of collision detection sensors provided in the vehicle. The plurality of collision detection sensors may be provided at different positions of the vehicle. The output data 130 may include a collision type determination result with respect to the collision signal included in the input data 110. The collision type determination result may include, for example, probability values for each of a designated plurality of collision types. The collision type may indicate at least one of a collision part with another object, a collision direction, and/or a collision strength.

According to an embodiment, the crash safety control logic of the collision safety model 120 may be configured as shown in FIG. 2. For example, the collision safety model 120 may include a long short-term memory (LSTM) or recurrent neural network (RNN, 210) that outputs a hidden state signal $h_t$ 203 based on a collision signal $x_t$ 201. The RNN 210 may include an input layer, an output layer, and one or more hidden layers. The RNN 210 has a cyclic structure therein, so the past learning is multiplied by a weight and reflected in the current learning, and thus structurally the current output result is affected by the output result in the past. The hidden layer of the RNN 210 serves as a kind of memory function. Accordingly, it may be effective to perform classification or prediction by learning sequential data. According to an embodiment, the LSTM is a neural network that can solve a problem in that old past data of the RNN 210 disappears without providing any effect, and thus may be effective to perform classification or prediction by learning sequential data, like the RNN 210.

According to an embodiment, the crash safety control logic of the collision safety model 120 may further include a feature extraction network 220, a deployment decision unit 230, and a collision type classification unit 240.

The feature extraction network 220 may map the hidden state signal $h_t$ 203 into a feature space or an embedding space in order to obtain meaningful results from the hidden state signal $h_t$ 203 of the RNN 210 (e.g., whether to deploy the passenger protection device or not, the collision type).

According to an embodiment, the feature extraction network 220 may include fully connected layers (FC layers, 221, 224), batch normalization layers (Batch Norm layers, 222, 225), and rectified linear unit layers (ReLU layers, 223, 226).

The FC layers 221 and 224 may flatten the output of the previous layer and convert the same into a multidimensional single vector that may be an input of the next stage. For example, the FC (128) layer 221 may convert the hidden state signal $h_t$ 221 into a 128-dimensional vector, and the FC (10) layer 224 may convert the output signal from the ReLU layer 223 into a 10-dimensional vector.

The batch normalization layers 222 and 225 may normalize a data distribution of each layer in which the mean is 0 and the variance is 1. The batch normalization layers 222 and 225 may improve a learning speed by preventing output values of the multi-layer network from being diverged or destroyed.

The ReLU layers 222 and 226 are activation functions that impart a non-linearity to the multi-layer network, and when the input value is a negative number, it may be deactivated and thus output a zero, and when the input value is a positive number, it may be activated and thus output the corresponding value as it is. If the non-linearity is not provided, it is difficult to achieve the learning objective because it is possible to be converted into an equivalent single layer even if there are multiple hidden layers, and accordingly the activation function that imparts non-linearity as above needs to be applied thereto.

According to an embodiment, the deployment decision unit 230 includes an FC (2) layer 231 and a softmax layer 233, and the collision type classification unit 240 may include an FC (5) layer 241 and a softmax layer 243. Each of the FC (2) layer 231 and the FC (5) layer 241 may flatten the output of the previous layer and convert the same into a single multidimensional vector that may be an input of the next stage. Each of the softmax layers 233 and 243 includes a function used for softmax regression, which is a generalized version of logistic regression, and may be converted into probability values between 0 and 1 for each classification type. Each of the deployment decision unit 230 and the collision type classification unit 240 may determine a classification value having the greatest probability values as a final result among probability values for each classification type of the corresponding softmax layers 233 and 243.

For example, the FC (2) layer 231 may convert a result signal output from the ReLU layer 226 into a two-dimensional vector in order to determine whether the passenger protection device operates or not, and the softmax layer 233 may determine whether the passenger protection device operates or not by normalizing the converted two-dimensional vector. The FC (5) layer 271 may convert the result signal output from the ReLU layer 226 into a 5-dimensional vector in order to determine the collision type, and the softmax layer 243 may normalize the converted 5-dimensional vector to determine probability values for each of the five predefined types. The five predefined collision types may include, for example, a head-on collision, a left-oblique collision, a right-oblique collision, an offset collision, and a small overlap collision.

As described above, the collision safety model 120 includes the crash safety control logic as shown in FIG. 2, and thus may output the output data 130 including a first output signal $d_t$ 205 indicating whether the passenger protection device is deployed (or whether being operated) or not and a second output signal $m_t$ 207 indicating the collision type determination result based on the collision signal $x_t$ 201, 110 provided from the collision detection sensors provided in the vehicle.

According to an embodiment, the collision signal $x_t$ 201, 110 provided from the collision detection sensors may mean a signal value/physical quantity vector obtained from the collision detection sensor at time t. For example, the collision signal $x_t$ 201, 110 provided from the collision detection sensors may include 12 time series signals (for example, 6 time series speed signals, 6 time series acceleration signals) obtained from 6 collision detection sensors. As another example, the collision signal $x_t$ 201, 110 provided from the collision detection sensor may include 14 time series signals. The 14 time series signals may include, for example, 12 time series signals obtained from 6 collision detection sensors, a signal representing the time series speed of the opposing vehicle, and a signal representing a time series state value of autonomous emergency braking AEB.

The collision safety model 120 may output the first output signal $d_t$ 205 indicating whether or not the passenger protection device is deployed through the crash safety control logic as shown in FIG. 2 based on the collision signal $x_t$ 201, 110. When the deployment (or operation) of the passenger protection device is determined, the collision safety model 120 may output the second output signal $m_t$ 207 indicating a collision type determination result. The second output signal $m_t$ 207 indicating the collision type determination result may indicate a relative probability for each of the predefined collision types. For example, the second output signal $m_t$ 207 may indicate that the detected collision may have a 90% probability of the head-on collision, a 5% probability of the right-oblique collision, a 5% probability of the left-oblique collision, and a 0% probability of the offset collision, and a 0% probability of the small overlap collision. In this case, the collision safety model 120 may determine the collision type as the head-on collision.

The reason for classifying the collision types at the collision safety model 120 is that even if the operating time (or deployment time) of the passenger protection device according to the collision signal is the same, the operating method of the passenger protection device may be different depending on the collision type. For example, since the passenger protection device to be operated in the case of the head-on collision and the passenger protection device to be operated in the case of the right-oblique collision may be different from each other, the collision safety model 120 needs to determine the collision type together with the operating time of the passenger protection device According to various embodiments, the association analyzer 140 may perform perturbation that changes at least one factor (or element) of the input data 110 provided to the collision safety model 120. The association analyzer 140 may analyze an association between the collision detection sensor and the collision type based on the input data having the changed at least one factor.

According to an embodiment, the association analyzer 140 may include a factor perturbation module 142 and an estimation module 144. The association analyzer 140 may generate changed input data by changing at least one factor included in the input data 110 through the factor perturbation module 142. The changed input data in which at least one factor is changed may be referred to as the perturbation data or a noise data. For example, as shown in FIG. 3, the factor perturbation module 142 may obtain input data 310 including time series signal values (for example, speed and/or acceleration) from the plurality of collision detection sensors, and change a signal value of a specific collision detection sensor included within a designated perturbation range in the obtained input data 310 to an arbitrary value. As shown in FIG. 4, the perturbation range 403 may be designated to include only signal values obtained from the plurality of sensors after a collision occurrence time 401. Since the signal values obtained from the plurality of collision detection sensors before the collision occurrence time 401 do not affect the collision type, when the perturbation range is limited as being a time after the collision occurrence time 401, the reliability of the operation cause analysis result can be improved. However, according to various embodiments, the perturbation range may be designated to necessarily include signal values obtained from the plurality of sensors before the collision occurrence time 401.

The factor perturbation module 142 may obtain perturbation data 320 having changed signal values 321 and 323 by changing a signal value of a specific collision detection sensor included within a designated perturbation range.

The association analyzer 140 may provide the perturbation data 320 obtained by the factor perturbation module 142 to the collision safety model 120, 330, and obtain a perturbation output data 342 corresponding to the perturbation data 320 from the collision safety model 120.

The association analyzer 140 may compare the output data corresponding to the input data with the perturbation output data corresponding to the perturbation data through the estimation module 144, and estimate an association between the changed signal value and the collision type. For example, as shown in FIG. 3, the estimation module 144 may generate an importance degree map 350 by comparing 350 an output data 341 of the collision safety model 120, 330 for the input data 310 and the perturbation output data 342 of the collision safety model 120, 330 for the perturbation data 320. The importance degree map 350 for the collision signal may indicate an association between the plurality of collision detection sensors and the collision type.

According to an embodiment, when the output data 341 and the perturbation output data 342 are the same, the estimation module 144 may determine that the changed signal values 321 and 323 do not affect the collision type.

When the output data 341 and the perturbation output data 342 are different, the estimation module 144 may determine that the changed signal values 321 and 323 affect the collision type. For example, as shown in FIG. 5, it is assumed a case where the factor perturbation module 142 changes the fourth signal value of 3 (511) of a sensor B to 0 in the input data 510, so that the fourth signal value of the sensor B in the perturbation data 520 is 0 (513). In this case, the output data 541 corresponding to the input data 510 may indicate that the collision type A: 80%, the collision type B: 5%, the collision type C: 5%, the collision type D: 10%, and the perturbation output data 542 corresponding to the perturbation data 513 may indicate that the collision type A: 50%, the collision type B: 25%, the collision type C: 15%, the collision type D: 10%. The estimation module 144 may confirm that the values of the collision type A, collision type B, and collision type C are changed and the value of collision type D is unchanged by comparing the output data 541 with the perturbation output data 542. Accordingly, the estimation module 144 may estimate that the fourth signal value of the sensor B is associated with the collision types A, B, and C, and that the fourth signal value of the sensor B is not associated with the collision type D.

As described above, the association analyzer 140 may estimate an association between each of the plurality of collision detection sensors and the collision type by sequentially changing a signal value of each of the plurality of collision detection sensors. For example, as shown in FIG. 6, the association analyzer 140 may estimate an association between the sensor B and the collision types based on the perturbation data 1 (520) in which the fourth signal value 513 of the sensor B is changed, and then estimate an association between the sensor C and the collision types based on the perturbation data 2 (612) in which the fifth signal value 614 of the sensor C is changed. For example, the association analyzer 140 may estimate an association between the sensor B and the collision types by comparing the output data 541 corresponding to the input data 510 with the perturbation output data 1 (542) corresponding to the perturbation data 1 (520). Thereafter, the association analyzer 140 compares the output data 541 corresponding to the input data 510 with the perturbation output data 2 (622) corresponding to the perturbation data 2 (612), and estimate an association between the sensor B and the collision types. Although not shown, the association analyzer 140 may estimate an association between each of the other sensors and the collision types by applying the same method to the other sensors. According to an embodiment, the association analyzer 140 may generate an importance degree map 631 indicating an association between each sensor and the collision types.

According to various embodiments, the association analyzer 140 may analyze the operation cause of the crash safety control logic through the importance degree map generated as described above. For example, the association analyzer 140 may determine, based on the importance degree map, what is the cause of operating a specific passenger protection device(s) in a vehicle collision situation. That is, since the passenger protection device(s) to be operated in a vehicle collision situation is/are determined according to the collision type, the association analyzer 140 may determine whether a signal obtained from which collision detection sensor of the plurality of collision detection sensor contributes the operation of the specific passenger protection device by analyzing the association between the collision detection sensor and the collision type.

According to various embodiments, the association analyzer 140 may output at least one of the importance degree map, the association between the collision detection sensor and the collision type, and information on a collision detection sensor that causes an operation of a specific passenger protection device(s) through at least one output device (not shown) provided in the operation cause analysis system 100. The at least one output device may include at least one of a display and a speaker.

Figure 7:
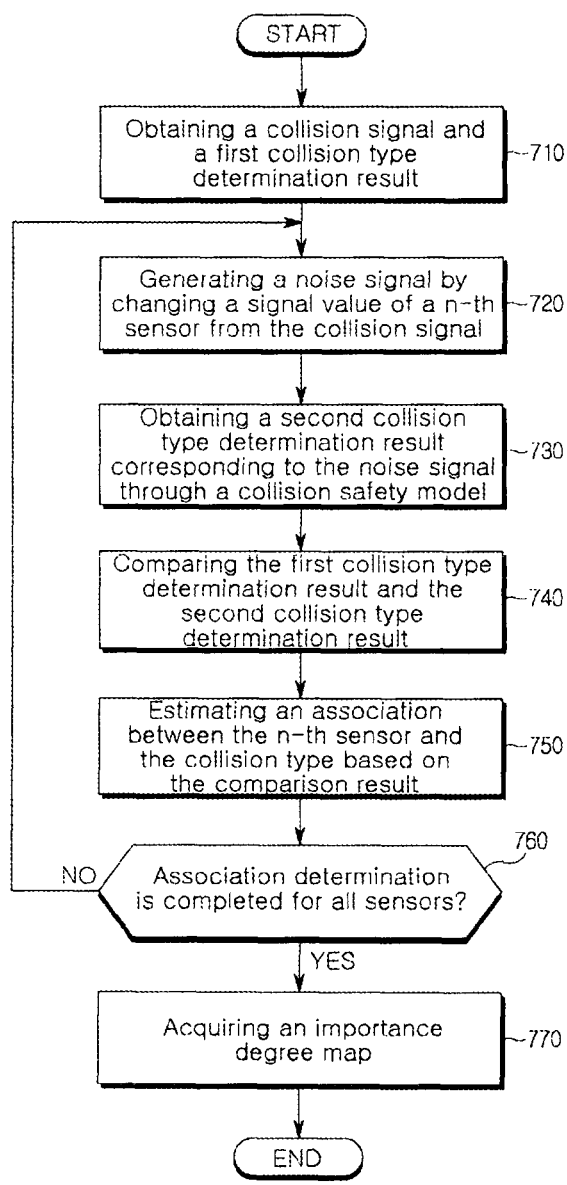
FIG. 7 is a flowchart for analyzing an operation cause of a deep learning-based crash safety control logic by using the XAI methodology in a vehicle according to various embodiments of the present disclosure.

FIG. 7 is a flowchart for analyzing an operation cause of a deep learning-based crash safety control logic by using the XAI methodology in a vehicle according to various embodiments of the present disclosure. In the following embodiment, the operations may be sequentially performed, but are not necessarily sequentially performed. For example, the sequential position of each operation may be changed, or at least two operations may be performed in parallel. In addition, the following operations may be performed by the operation cause analysis system 100 provided in the vehicle 100 and/or other devices (e.g., a server, or an electronic device) or be implemented with executable instructions by the operation cause analysis system 100.

Referring to FIG. 7, in operation 710, the operation cause analysis system 100 may obtain a collision signal and a first collision type determination result. The collision signal may include time-series speed and/or acceleration values obtained from the plurality of collision detection sensors. For example, the collision signal may include speed and/or acceleration values continuously measured over time by each collision detection sensor. The first collision type determination result may be a result obtained by inputting a collision signal to the collision safety model 120. The first collision type determination result may include probability values for each of the designated collision types. For example, the first collision type determination result may include a probability of the collision type A, a probability of the collision type B, a probability of the collision type C, and a probability of the collision type D as the collision type corresponding to the collision signal.

In operation 720, the operation cause analysis system 100 may generate a noise signal by changing a signal value of the n-th sensor in the collision signal. According to an embodiment, the operation cause analysis system 100 may generate a noise signal (or noise data, perturbation data) by changing a signal value included within a designated perturbation range among time series signal values of a specific sensor in the collision signal to an arbitrary value.

In operation 730, the operation cause analysis system 100 may obtain a second collision type determination result corresponding to the noise signal through the collision safety model 120. For example, the operation cause analysis system 100 may input to the collision safety model a noise signal in which the signal value of the specific sensor is changed, and obtain a second collision type determination result from the collision safety model. According to an embodiment, the second collision type determination result may include probability values for each collision type with respect to the noise signal. For example, the second collision type determination result may include a probability of the collision type A, a probability of the collision type B, a probability of the collision type C, and a probability of the collision type D as the collision type corresponding to the noise signal.

In operation 740, the operation cause analysis system 100 may compare the first collision type determination result with the second collision type determination result.

For example, the operation cause analysis system 100 may confirm whether the probability values of each of the collision types included in the first collision type determination result and the probability values of each of the collision types included in the second collision type determination result are the same.

In operation 750, the operation cause analysis system 100 may determine an association between the n-th sensor and the collision type based on the comparison result. According to an embodiment, the operation cause analysis system 100 may determine that, when the probability values of each of the collision types included in the first collision type determination result and the probability values of each of the collision types included in the second collision type determination result are all the same, there is no association between the n-th sensor and each of the collision types. According to an embodiment, the operation cause analysis system 100 may determine that when the probability values of each of the collision types included in the first collision type determination result and the probability values of each of the collision types included in the second collision type determination result are at least partially different, the n-th sensor and the collision type having a different probability value have an association.

According to an embodiment, the association may include an importance degree of the n-th sensor for a specific collision type. When the probability value of the first collision type included in the first collision type determination result and the probability value of the first collision type included in the second collision type determination result are different, the operation cause analysis system 100 may estimate that the probability value of the first collision type is changed due to the change of the signal of the n-th sensor. The operation cause analysis system 100 may calculate a difference between the probability value of the first collision type included in the first collision type determination result and the probability value of the first collision type included in the second collision type determination result, and determine the importance degree of the n-th sensor for the first collision type based on the calculated difference. According to an embodiment, as the calculated difference is greater, the importance degree of the n-th sensor to the first collision type is determined to be relatively high, and as the calculated difference is smaller, the importance degree of the n-th sensor to the first collision type is relatively low.

In operation 760, the operation cause analysis system 100 may determine whether the association determination is completed for all sensors. For example, the operation cause analysis system 100 may determine whether the determination of association with the collision type is completed for all of the plurality of collision detection sensors provided in the vehicle.

If the association determination is not completed for all of the sensors, the operation cause analysis system 100 may return to operation 710 to re-perform subsequent operations. For example, the operation cause analysis system 100 may generate a noise signal by changing a signal value of another sensor whose association with the collision type is not determined, and may re-perform operations 720 to 740 based on the generated noise signal.

When the association determination is completed for all the sensors, the operation cause analysis system 100 may generate an importance degree map indicating the association between all the sensors and the collision type in operation 770. The importance degree map may indicate, for example, an association between each of the plurality of collision detection sensors provided in the vehicle and the collision types.

According to various embodiments, the operation cause analysis system 100 may determine at least one collision detection sensor that has affected the collision type determination result corresponding to the collision signal based on the importance degree map generated as described above. For example, the operation cause analysis system 100 may determine whether by which sensor(s) among the plurality of collision detection sensors a specific collision type is determined thereby operating a passenger protection device corresponding to the specific collision type. The operation cause analysis system 100 may output the importance degree map and/or information one the determined at least one collision detection sensor that as affected the collision type determination result, through at least one output device (not shown) provided in the operation cause analysis system 100. The at least one output device may include at least one of a display and a speaker As described above, according to various embodiments of the present disclosure, the validity and reliability of the crash safety control logic can be improved by analyzing the operation cause of the deep learning-based crash safety control logic using the XAI methodology in the vehicle. In addition, it is possible to induce an efficient and reliable response to product liability in the event of a collision by inferring an association between each of the collision sensors provided at different positions of the vehicle and the collision type.

What is claimed is:

1. A system for analyzing an operation cause of a crash safety control logic of a vehicle comprising:
   a collision safety model configured to receive a collision signal including signal values obtained from a plurality of collision detection sensors, and output a first collision type determination result corresponding to the collision signal according to a deep learning-based crash safety control logic; and
   an association analyzer configured to analyze an association between each of the plurality of collision detection sensors and collision types included in the first collision type determination result based on the collision signal and the first collision type determination result,
   wherein the association analyzer is further configured to:
      generate a noise signal by changing a first signal value of a first collision detection sensor among the signal values included in the collision signal,
      obtain a second collision type determination result corresponding to the noise signal using the collision safety model, and
      estimate an association between the first collision detection sensor and the collision types by comparing the first collision type determination result and the second collision type determination result.

2. The system of claim 1,
   wherein each of the first collision type determination result and the second collision type determination result comprises each probability value for each collision type.

3. The system of claim 2,
   wherein the association analyzer is further configured to estimate an association between the first collision detection sensor and the collision types by comparing each probability value for each collision type included in the first collision type determination result and each probability value for each collision type included in the second collision type determination result.

4. The system of claim 3,
   wherein the association analyzer is further configured to estimate that, if the each probability value for each collision type included in the first collision type determination result are all the same as the each probability value for each collision type included in the second collision type determination result, the first collision detection sensor and the collision types have no association.

5. The system of claim 3,
   wherein the association analyzer is further configured to estimate that, if probability values for a first collision type in the first collision type determination result and the second collision type determination result are different as a result of comparing the each probability value for each collision type included in the first collision type determination result and the each probability value for each collision type included in the second collision type determination result, the first collision detection sensor and the first collision type have an association.

6. The system of claim 5,
   wherein the association comprises an importance degree of the first collision detection sensor for the first collision type, and
   wherein the importance degree is determined based on a difference between a probability value of the first collision type included in the first collision type determination result and a probability value of the first collision type included in the second collision type determination result.

7. The system of claim 6,
   wherein the association analyzer is further configured to:
   estimate each association with the collision types with respect to each of collision detection sensors other than the first collision detection sensor, and
   generate an importance degree map indicating an association between each of the plurality of collision detection sensors and the collision types.

8. The system of claim 1,
   wherein the association analyzer is configured to generate the noise signal by changing the first signal value of the first collision detection sensor included in a designated perturbation range among the signal values included in the collision signal into an arbitrary value, and
   wherein the designated perturbation range is set to comprise signal values obtained from the plurality of collision detection sensors after a collision occurrence time.

9. A method of operating a system for analyzing an operation cause of a crash safety control logic of a vehicle comprising:
   obtaining a collision signal including signal values obtained by a plurality of collision detection sensors, and a first collision type determination result based on the collision signal through a collision safety model;
   generating a noise signal by changing a first signal value of a first collision detection sensor among the signal values included in the collision signal;
   obtaining a second collision type determination result based on the noise signal using the collision safety model; and
   estimating an association between the first collision detection sensor and a plurality of collision types by comparing the first collision type determination result and the second collision type determination result.

10. The method of claim 9,
wherein each of the first collision type determination result and the second collision type determination result comprises probability values for the collision types.

11. The method of claim 10,
wherein the association between the first collision detection sensor and the plurality of collision types is estimated by comparing each probability value for each collision type included in the first collision type determination result and each probability value for each collision type included in the second collision type determination result.

12. The method of claim 11,
wherein, if the each probability value for each collision type included in the first collision type determination result are the same as the each probability value for each collision type included in the second collision type determination result, it is estimated that the first collision detection sensor and the plurality of collision types have no association.

13. The method of claim 11,
wherein, if probability values for a first collision type in the first collision type determination result and the second collision type determination result are different as a result of comparing the each probability value for each collision type included in the first collision type determination result and the each probability value for each collision type included in the second collision type determination result, it is estimated that the first collision detection sensor and the first collision type have an association.

14. The method of claim 13,
wherein the association comprises an importance degree of the first collision detection sensor for the first collision type, and
wherein the importance degree is determined based on a difference between a probability value of the first collision type included in the first collision type determination result and a probability value of the first collision type included in the second collision type determination result.

15. The method of claim 14, further comprising:
generating an importance degree map indicating an association between each of the plurality collision detection sensors and the collision types.

16. The method of claim 9,
wherein the noise signal is generated by changing the first signal value of the first collision detection sensor included in a designated perturbation range among signal values included in the collision signal into an arbitrary value, and
wherein the designated perturbation range is set to comprise signal values obtained from the plurality of collision detection sensors after a collision occurrence time.

* * * * *